(12) United States Patent
Roy

(10) Patent No.: US 6,317,591 B1
(45) Date of Patent: *Nov. 13, 2001

(54) TELEPHONY DEVICE COMPRISING A BASE STATION AND AT LEAST A SUBSCRIBER UNIT, SUBSCRIBER UNIT FOR SUCH A TELEPHONY DEVICE AND METHOD USED IN SUCH A TELEPHONY DEVICE

(75) Inventor: Nathalie Roy, Le Mans (FR)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,202

(22) Filed: Apr. 22, 1998

(30) Foreign Application Priority Data

Apr. 30, 1997 (FR) ................................................... 97 05381

(51) Int. Cl.[7] .................................................. H04M 11/10
(52) U.S. Cl. .......................... 455/412; 455/561; 455/414; 455/426; 455/466; 455/566
(58) Field of Search .................................... 455/561, 562, 455/412, 413, 414, 415, 422, 466, 566, 115, 421; 379/88.11, 88.12

(56) References Cited

U.S. PATENT DOCUMENTS

| | | | |
|---|---|---|---|
| 5,313,515 | * | 5/1994 | Allen et al. .......................... 455/413 |
| 5,321,739 | | 6/1994 | Higashiyama ........................ 379/61 |
| 5,510,924 | * | 4/1996 | Terui et al. ......................... 359/143 |
| 5,613,213 | * | 3/1997 | Naddell et al. ...................... 455/414 |
| 5,778,314 | * | 7/1998 | Sudo et al. ........................... 455/412 |
| 5,802,466 | * | 9/1998 | Gallant et al. ....................... 455/413 |
| 5,857,012 | * | 1/1999 | Paul ...................................... 379/34 |
| 5,878,033 | * | 3/1999 | Mouly .................................. 370/312 |
| 5,884,160 | * | 3/1999 | Kanazaki ............................. 455/413 |
| 5,889,839 | * | 3/1999 | Beyda et al. ....................... 379/88.12 |
| 5,890,056 | * | 3/1999 | Garner et al. ....................... 455/67.1 |
| 5,933,477 | * | 8/1999 | Wu ................................... 379/88.26 |

FOREIGN PATENT DOCUMENTS

WO 9641490   12/1996   (WO) .............................. H04Q/7/22

* cited by examiner

Primary Examiner—Tracy Legree
Assistant Examiner—Charles Graver
(74) Attorney, Agent, or Firm—Dicran Halajian

(57) ABSTRACT

A telephony device is formed by a base station and subscriber units. The telephony device includes a responder circuit formed predominantly by a flash memory located in the base station. The responder circuit has various states: on line, in service, in possession or not of a message ... etc. These states may be displayed on the screens of all the subscriber units by a broadcast of messages transmitted from the base station.

18 Claims, 2 Drawing Sheets

TELEPHONY DEVICE COMPRISING A BASE STATION AND AT LEAST A SUBSCRIBER UNIT, SUBSCRIBER UNIT FOR SUCH A TELEPHONY DEVICE AND METHOD USED IN SUCH A TELEPHONY DEVICE

FIELD OF THE INVENTION

The invention relates to a telephony device comprising a base station connected to the switched network, at least a subscriber unit and at least a communication element of the responder type, notably linked with the base station which has a management element formed, inter alia, by a processor assembly, by a memory containing an execution program and by a random-access memory.

The invention likewise relates to a method used in such a telephony device and also relates to a subscriber unit suitable for such a telephony device.

The invention finds interesting applications in telecommunication systems implying protocols which is notably the case with telephony devices satisfying the DECT standard, for example.

BACKGROUND OF THE INVENTION

The telephony devices of this type very often comprising numerous subscriber units offer more and more functions to the user. One of these functions is that of the responder which makes it possible to receive and transmit messages for those who call and which authorize the return of messages to the user at his request.

A problem posed with this type of device is for the user who may be located far from the base station to know whether he has messages. The user may also have the need to make an announcement and thus desires to know whether his responder is available. This problem is all the more serious when one faces devices that satisfy the DECT standards which may thus comprise a large number of subscriber units.

SUMMARY OF THE INVENTION

The present invention proposes a device of the type defined in the opening paragraph which permits a user to manage in an easy fashion the accesses to the responder inserted into the base station.

Therefore, such a device is characterized in that data about the state of the communication element is broadcast to all the subscriber units.

The idea of the invention consists of utilizing the possibility of broadcasting data to all the subscriber units so as to make known to them the state of their responder and, possibly, communicating with them.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
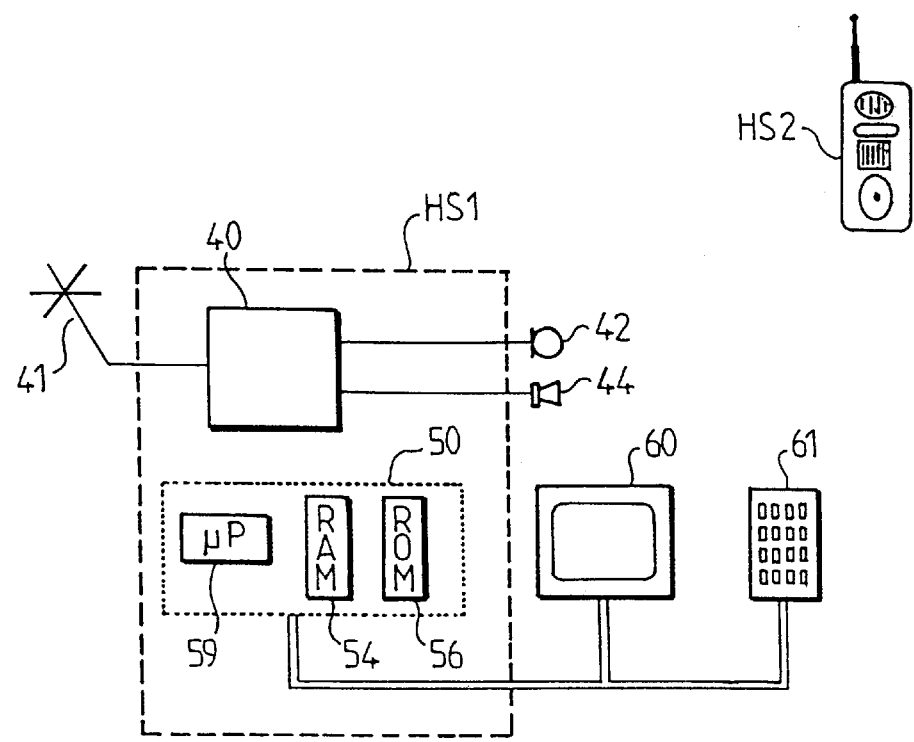
FIG. 1 shows a device according to the invention.
Figure 1:
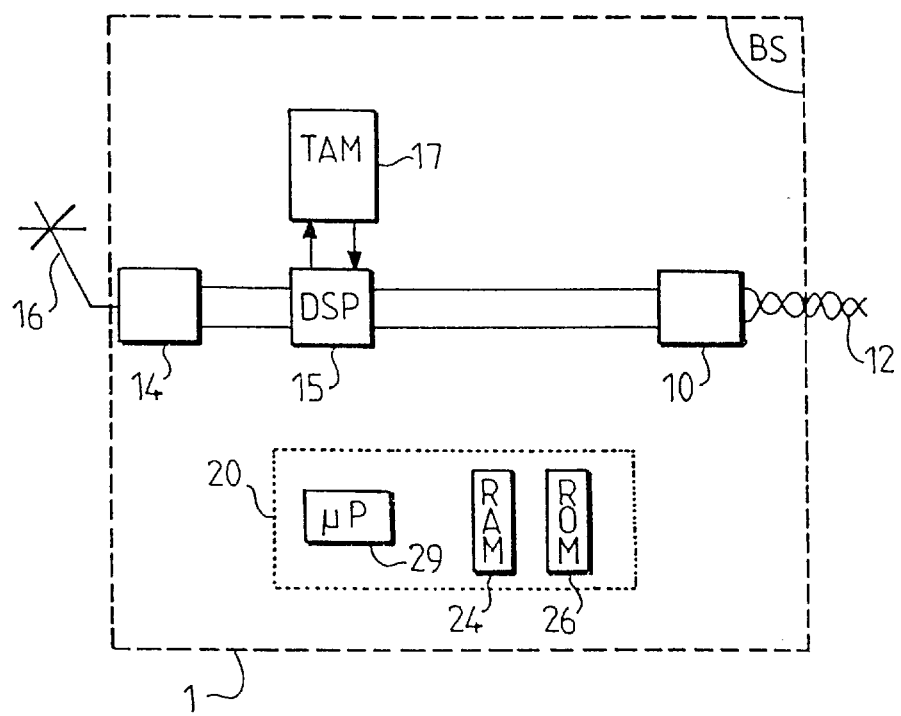

In FIG. 1, the device which is represented is a device satisfying the DECT standards. Reference 1 shows the base station BS to which may be connected, by radio channel, a plurality of subscriber units (handsets) HS1, HS2, . . . This base station 1 comprises, inter alia, a line circuit 10 which makes it possible for connecting the base station to the switched network by a telephone line 12 and a radio circuit 14 which authorizes the dialogue with the various subscriber units HS1, HS2, . . . , by emitting and receiving waves via an antenna 16. For processing all the analog information which transits the basic circuit, a signal processing element 15 is provided formed around a digital signal processor DSP which processes notably the speech signals. A flash memory 17 is used for performing the function of responder. That is to say that it contains the speech data coming from remote subscribers through line 12 and also announcement data which are more often than not intended for these remote subscribers. The data of this memory 17 are processed by the circuit 15 which carries out the various analog/digital conversions and vice versa.

All the elements of this basic circuit 1 are managed by a microprocessor assembly 20. This assembly is formed, notably, in usual manner by a random-access memory 24, a read-only memory 26 containing the instructions and operation of the device and a management processor 29. With this assembly it is possible to know when the flash memory 17 which is the main constituent part of the responder function is available or not and if a message has been registered there or not.

The subscriber unit HS1, only shown in detail (the unit HS2 may have an identical structure) comprises a communication assembly 40 with an antenna 41 which permits the unit to communicate with the base station BS and from there with the other subscriber units HS2, . . . This assembly processes the information coming from the microphone 42 and also produces signals for an earphone 44. Also provided is a management element 50 formed, just like the management element 20, by a random-access memory 54, a read-only memory 56 containing the operating instructions of the device, and by a management processor 59. The subscriber unit HS1 also has a screen 60 on which the various data are displayed and a keyboard 61. These handsets are mobiles and because of this they are fed by an accumulator not shown on the FIG. 1.

According to the invention, the state of the responder circuit is shown on the screen 60 without the intervention of the user. This is achieved due to an interesting characteristic feature of the invention by realizing a message broadcast. For this purpose, the prescriptions of the paragraph 7.2.4.3 of the ETS standard 300 175-3 are used.

The Table I below shows how this standard is used.

TABLE I

| Data | binary word |
|---|---|
| Responder in service | M1 = 0111 0011 0000 0001 |
| Responder not in service | M1' = 0111 0011 0000 0000 |
| Registered messages | M2 = 0111 0011 0000 0010 |
| No messages | M2' = 0111 0011 0000 0011 |
| Aligned responder | M3 = 0111 0011 0000 0100 |
| Non-aligned responder | M3' = 0111 0011 0000 0101 |

Thus, word pairs are found which are mutually exclusive. M1 and M1' are mutually exclusive as are the pairs M2, M2' and M3 and M3'. These words are explained at the places referenced a32 to a47 of said standard.

Figure 2:
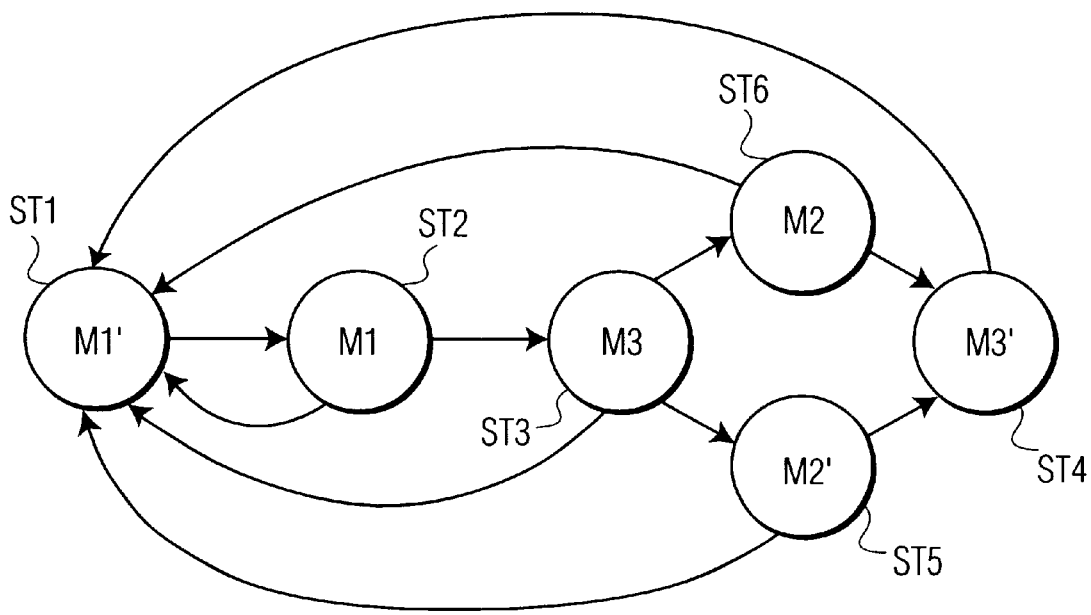
FIG. 2 shows a diagram explaining the operation of the base station.

In FIG. 2 are explained the operation steps of the responder circuit.

The state ST1 is considered which indicates that the responder is not in service, thus the word M1' is transmitted in the direction of all the subscriber units. If the responder is put into operation, for example, by validating this start which appears on a menu visible on a screen of the base station, then state ST2 is proceeded to, the word M1 is thus transmitted. After that, the responder may be aligned, state ST3 corresponding to the transmission of the word M3 for carrying out a task such as: registering a message which comes from the telephone line 12, broadcasting an announcement over this telephone line 12 or also returning a message to a user on one of the subscriber units. Having performed its task, the responder changes to the state ST4 corresponding to the transmission of the word M3' by passing either through the state ST5 which indicates that no message has been registered during the alignment, or by passing through state ST6 which indicates that a message has been registered. The states ST5 and ST6 imply the transmission of the words M2' and M2, respectively. It is evident that from each of these states one may come back to the state ST1 by deactivating the responder function.

Figure 3:
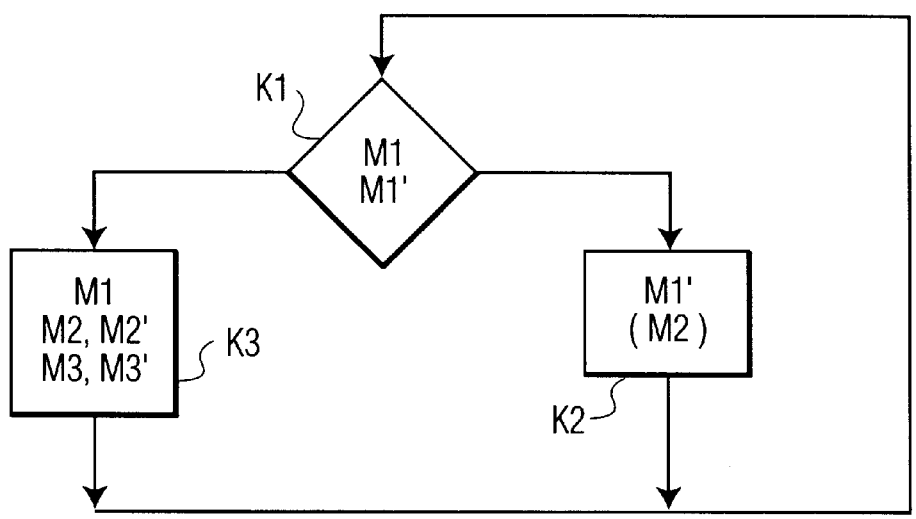
FIG. 3 shows a diagram explaining the operation of a subscriber unit.

Starting from a subscriber unit, one may consult the state of this responder circuit by validating certain items of a menu. This is shown in a diagram in FIG. 3.

If the word M1' has been transmitted, which is detected in box K1, thus signaling that the responder is not in service, only this data M1' is visible to the user. He is thus shown that the responder is not in service (box K2). If the word M1 has been transmitted, then the data concerning the words M1, M2 or M2', M3 or M3' are visible (box K3).

These various words are transmitted periodically, so that, if a subscriber unit is no longer in the coverage area of the base station, the state data concerning the responder will be updated the moment the subscriber unit will come back to said coverage area.

However, it should be observed that the words M1' and M2 are not exclusive. Indeed, it may happen that the user has:

put his responder into operation, transmission of the word M1, received messages, transmission of the word M2, put his responder out of operation, without reading the messages, transmission of the word M1'.

In this case, the words M2 and M1' will be transmitted at the moment of the change of state and after that periodically. And the data corresponding to the words M2 and M1' will have to be visible.

What is claimed is:

1. A telephony system comprising:

a base station having a responder available to authorized users, said responder operable to be turned off by said authorized users, said responder storing messages received by said base station and transmitting said messages to said authorized users of said base station in response to requests from said authorized users;

at least one handset which communicates with said base station; wherein said base station broadcasts status of said responder to said at least one handset, said status including said responder being available but turned off by said authorized users.

2. The telephony system of claim 1, wherein said base station and said handset satisfy the DECT standard, and said state data corresponds to the ETS300175-3 standard at paragraph 7.2.4.3.

3. The telephony system of claim 1, wherein said responder includes a flash memory.

4. The telephony system of claim 1, wherein said status is displayed on a screen of said at least one handset.

5. The telephony system of claim 1, wherein said status is displayed on a screen of said at least one handset without intervention of a user of said handset.

6. The telephony system of claim 1, wherein said base station periodically broadcasts said status to said at least one handset.

7. The telephony system of claim 1, wherein said base station periodically broadcasts said status to said at least one handset so that said status is received by said at least one handset and updated when said at least one handset is in range of said base station.

8. The telephony system of claim 1, wherein said status further includes whether said responder is turned on or in possession of a message.

9. A cordless telephone which communicates with a base station, said cordless telephone comprising a screen which displays status of a responder of said base station, said responder operable to be turned off by authorized users of the responder, said responder storing messages received by said base station and transmitting said messages to said cordless telephone in response to predetermined requests from said cordless telephone; wherein said status includes said responder being available but turned off by said authorized users.

10. The cordless telephone of claim 9, wherein said responder includes a flash memory.

11. The cordless telephone of claim 9, wherein said status is displayed on said screen without intervention of a user of said cordless telephone.

12. The cordless telephone of claim 9, wherein said base station periodically broadcasts said status to said at least one handset.

13. The cordless telephone of claim 9, wherein said base station periodically broadcasts said status to said cordless telephone so that said status is received by said cordless telephone and updated when said cordless telephone is in range of said base station.

14. The cordless telephone of claim 9, wherein said status includes further whether said responder is turned on or in possession of a message.

15. A method of communication between a wireless telephone and a base station comprising:

storing messages received by said base station in a responder of said base station said responder operable to be turned off by authorized users of the responder;

transmitting said messages to authorized users of said base station in response to requests from said authorized users;

broadcasting status of said responder by said base station; and receiving said status by said wireless telephone, said status including said responder being available but turned off by said authorized users.

16. The method of claim 15, further comprising displaying said status on a screen of said wireless telephone.

17. The method of claim 15, further comprising displaying said status on a screen of said wireless telephone without intervention of a user of said wireless telephone.

18. The method of claim 15, wherein said status includes further whether said responder is turned on or in possession of a message.

* * * * *